(12) United States Patent
Saito et al.

(10) Patent No.: US 11,210,157 B2
(45) Date of Patent: Dec. 28, 2021

(54) OUTPUT METHOD AND INFORMATION PROCESSING APPARATUS

(71) Applicant: FUJITSU LIMITED, Kawasaki (JP)

(72) Inventors: Yuji Saito, Yokohama (JP); Tetsuya Uchiumi, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 16/802,694

(22) Filed: Feb. 27, 2020

(65) Prior Publication Data
US 2020/0293393 A1    Sep. 17, 2020

(30) Foreign Application Priority Data
Mar. 12, 2019   (JP) .............................. JP2019-045267

(51) Int. Cl.
*G06F 11/00*    (2006.01)
*G06F 11/07*    (2006.01)
(Continued)

(52) U.S. Cl.
CPC ...... *G06F 11/0784* (2013.01); *G06F 11/0772* (2013.01); *G06F 11/3075* (2013.01); *G06F 11/327* (2013.01)

(58) Field of Classification Search
CPC ............. G06F 11/0709; G06F 11/0778; G06F 11/0784; G06F 11/3075; G06F 11/327; G06F 11/0751; G06F 11/0787
See application file for complete search history.

(56) References Cited

U.S. PATENT DOCUMENTS 6,701,198 B1 *  3/2004  Vandesteeg ........ G05B 19/0425
                                                    700/21
9,632,861 B1 *  4/2017  Watanabe ........... H04L 41/0631
(Continued)

FOREIGN PATENT DOCUMENTS

JP   2006-004346 A   1/2006
JP   2017-072882 A   4/2017

OTHER PUBLICATIONS

Yukihiro Watanabe et al., "Online Failure Prediction in Cloud Datacenters by Real-time Message Pattern Learning", 2012 IEEE 4th International Conference on Cloud Computing Technology and Science, Taipei, pp. 504-511, 2012 (Total 8 pages).
(Continued)

*Primary Examiner* — Charles Ehne
(74) *Attorney, Agent, or Firm* — Fujitsu Patent Center

(57) ABSTRACT

A non-transitory computer-readable recording medium has stored therein a program that causes a computer to execute a process including creating a frequent message group based on an appearance frequency of each message included in a message group that is generated in the past, in response to a generation of an error message; extracting, as an error periphery log, a message group within a predetermined time period before and after the error message from an accumulated message group; determining whether or not the error message is included in the frequent message group based on a degree of relation between the error periphery log and the frequent message group; and outputting a message that is not included in the frequent message group in the error periphery log as a related message associated with the error message based on a result of the determining.

7 Claims, 29 Drawing Sheets

(51) Int. Cl.
    *G06F 11/30*    (2006.01)
    *G06F 11/32*    (2006.01)

(56) References Cited

U.S. PATENT DOCUMENTS

| | | |
|---|---|---|
| 2005/0283680 A1 | 12/2005 | Kobayashi et al. |
| 2012/0151282 A1* | 6/2012 | Watanabe ............ G06F 11/076 714/49 |
| 2017/0097863 A1 | 4/2017 | Ishii et al. |

OTHER PUBLICATIONS

Shotaro Tora et al., "Consideration of Change in Gap between Time Frames in Convolutive NMF", NTT Software Innovation Center, DEIM Forum 2015 F8-1(Total 11 pages: Translation of the relevant part included).

Wenwu Wang et al., "A Multiplicative Algorithm for Convolutive Non-Negative Matrix Factorization Based on Squared Euclidean Distance", IEEE Transactions on Signal Processing, vol. 57, No. 7, Jul. 2009 , pp. 2858-2864 (Total 7 pages).

\* cited by examiner

| MESSAGE GROUP | COUNTERMEASURE |
|---|---|
| ERROR IN XX YY SERVICE IS STOPPED | YY SERVICE IS ACTIVATED AFTER RESTART |
| ... | ... |

FIG. 7

MEANING OF SYMBOL
- OBSERVATION DATA MATRIX OF LEARNING LOG: Y
- WEIGHTING COEFFICIENT MATRIX OF LEARNING LOG: U
- OBSERVATION DATA MATRIX OF ERROR PERIPHERY LOG: Y'
- WEIGHTING COEFFICIENT MATRIX OF ERROR PERIPHERY LOG: U'
- BASE MATRIX(FREQUENT MESSAGE GROUP): $H_t \in R^{N \times K}$
- ANOMALY MESSAGE MATRIX: $A \in R^{N \times M}$
- MAXIMUM NUMBER OF FREQUENT MESSAGE GROUP: K
- NUMBER OF MESSAGE FORMAT: N
- TIME FRAME WIDTH OF OBSERVATION DATA MATRIX: $T_M$
- TIME WIDTH OF BASE MATRIX: T PREDEFINED INFORMATION
- TIME FRAME WIDTH OF OBSERVATION DATA MATRIX: $T_M$
- MAXIMUM NUMBER OF FREQUENT MESSAGE GROUP: K
- TIME WIDTH OF BASE MATRIX: T

FIG. 8

| LEARNING LOG | | MESSAGE FORMAT ID |
|---|---|---|
| TIME | MESSAGE | |
| ... | | |
| 1/1 00:00:05 | BACKUP IS STARTED WITH IP:192.168.0.1 | 2 |
| 1/1 00:10:00 | BACKUP IS COMPLETED WITH IP:192.168.0.1 | 3 |
| ... | | |
| 1/1 01:00:01 | ERROR IN DB | 1 |
| 1/1 01:00:05 | BACKUP IS STARTED WITH IP:192.168.0.2 | 2 |
| 1/1 01:10:00 | BACKUP IS COMPLETED WITH IP:192.168.0.2 | 3 |
| ... | | |
| 1/2 05:00:00 | A SERVICE IS ACTIVATED | 4 |
| 1/2 05:00:00 | B SERVICE IS ACTIVATED | 5 |
| 1/2 05:30:00 | A SERVICE IS ACTIVATED | 4 |
| 1/2 05:30:00 | B SERVICE IS ACTIVATED | 5 |
| ... | | |

FIG. 9

TARGET LOG: LEARNING LOG

| MESSAGE FORMAT ID | MESSAGE FORMAT | NUMBER OF APPEARANCE IN 1/1 00:00:00 TO 00:10:00 ⟶ 1/1 00:00:00 | 1/1 00:10:00 | 1/1 01:00:00 | 1/1 01:10:00 | ... | 1/1 05:00:00 | ... | 1/1 05:30:00 | ... |
|---|---|---|---|---|---|---|---|---|---|---|
| 1 | ERROR IN DB | 0 | 0 | 1 | 0 | ... | 0 | ... | 0 | ... |
| 2 | BACKUP IS STARTED WITH IP:* | 1 | 0 | 1 | 0 | ... | 0 | ... | 0 | ... |
| 3 | BACKUP IS COMPLETED WITH IP:* | 0 | 1 | 0 | 1 | ... | 0 | ... | 0 | |
| 4 | A SERVICE IS ACTIVATED | 0 | 0 | 0 | 0 | ... | 1 | ... | 1 | |
| 5 | B SERVICE IS ACTIVATED | 0 | 0 | 0 | 0 | ... | 1 | ... | 1 | |
| ... | | | | | | | | | | |

OBSERVATION DATA MATRIX Y

FIG. 10

BACKUP MESSAGE GROUP:

| MESSAGE FORMAT ID | | |
|---|---|---|
| 1 | 0 | 0 |
| 2 | 1 | 0 |
| 3 | 0 | 1 |
| 4 | 0 | 0 |
| 5 | 0 | 0 |
| ... | | |

SERVICE ACTIVATION MESSAGE GROUP:

| MESSAGE FORMAT ID | | |
|---|---|---|
| 1 | 0 | 0 |
| 2 | 0 | 0 |
| 3 | 0 | 0 |
| 4 | 1 | 0 |
| 5 | 1 | 0 |
| ... | | |

FIG. 11

TARGET LOG: ERROR PERIPHERY LOG

| TIME | MESSAGE |
|---|---|
| ... | ... |
| 1/31 23:30:01 | XXXXXX |
| 2/1 00:00:05 | BACKUP IS STARTED WITH IP:192.168.0.1 |
| 2/1 00:10:00 | BACKUP IS COMPLETED WITH IP:192.168.0.1 |
| ... | ... |
| 2/1 00:30:00 | ERROR IN DB |
| 2/1 00:32:00 | A SERVICE IS ACTIVATED |
| 2/1 01:30:00 | YYYYYY |
| ... | ... |

FIG. 12

TARGET LOG: ERROR PERIPHERY LOG

| MESSAGE FORMAT ID | MESSAGE FORMAT | ... | 2/1 00:00:00 | 2/1 00:10:00 | ... | 2/1 00:30:00 | ... |
|---|---|---|---|---|---|---|---|
| 1 | ERROR IN DB | ... | 0 | 0 | ... | 1 | ... |
| 2 | BACKUP IS STARTED WITH IP:* | ... | 1 | 0 | ... | 0 | ... |
| 3 | BACKUP IS COMPLETED WITH IP:* | ... | 0 | 1 | ... | 0 | ... |
| 4 | A SERVICE IS ACTIVATED | ... | 0 | 0 | ... | 1 | ... |
| 5 | B SERVICE IS ACTIVATED | ... | 0 | 0 | ... | 0 | ... |
| ... | | | | | | | |

OBSERVATION DATA MATRIX Y'

FIG. 13

| TARGET LOG: ERROR PERIPHERY LOG | | | | | |
|---|---|---|---|---|---|
| MESSAGE GROUP | 2/1 00:00:00 | 2/1 00:10:00 | ... | 2/1 00:30:00 | ... |
| BACKUP MESSAGE GROUP | 1 | 0 | ... | 0 | ... |
| SERVICE ACTIVATION MESSAGE GROUP | 0 | 0 | ... | 0 | ... |

WEIGHTING COEFFICIENT MATRIX U'

TARGET LOG: ERROR PERIPHERY LOG

ANOMALY MESSAGE MATRIX A

| MESSAGE FORMAT ID | MESSAGE FORMAT | 2/1 00:00:00 | 2/1 00:10:00 | ... | 2/1 00:30:00 | ... |
|---|---|---|---|---|---|---|
| 1 | ERROR IN DB | 0 | 0 | ... | 1 | ... |
| 2 | BACKUP IS STARTED WITH IP:* | 0 | 0 | ... | 0 | |
| 3 | BACKUP IS COMPLETED WITH IP:* | 0 | 0 | ... | 0 | |
| 4 | A SERVICE IS ACTIVATED | 0 | 0 | ... | 1 | |
| 5 | B SERVICE IS ACTIVATED | 0 | 0 | ... | 0 | |
| ... | | | | | | |

ANOMALY MESSAGE GROUP:
2/1 00:30:00 "ERROR IN DB"
2/1 00:30:00 "A SERVICE IS ACTIVATED"

TARGET ERROR MESSAGE: 2/1 00:30:00 ERROR IN DB

WEIGHTING COEFFICIENT MATRIX U'

| MESSAGE GROUP | 2/1 00:00:00 | 2/1 00:10:00 | ... | 2/1 00:30:00 | ... |
|---|---|---|---|---|---|
| BACKUP MESSAGE GROUP | 1 | 0 | | 0 | |
| SERVICE ACTIVATION MESSAGE GROUP | 0 | 0 | ... | 0 | ... |

FIG. 20

TARGET LOG: LEARNING LOG

| LEARNING LOG | | MESSAGE FORMAT ID |
|---|---|---|
| TIME | MESSAGE | |
| | ... | |
| 1/1 00:00:01 | ERROR IN DB | 1 |
| 1/1 00:00:05 | BACKUP IS STARTED WITH IP:192.168.0.1 | 2 |
| 1/1 00:10:00 | BACKUP IS COMPLETED WITH IP:192.168.0.1 | 3 |
| | ... | |
| 1/1 01:00:01 | ERROR IN DB | 1 |
| 1/1 01:00:05 | BACKUP IS STARTED WITH IP:192.168.0.2 | 2 |
| 1/1 01:10:00 | BACKUP IS COMPLETED WITH IP:192.168.0.2 | 3 |
| | ... | |
| 1/2 05:00:00 | A SERVICE IS ACTIVATED | 4 |
| 1/2 05:00:00 | B SERVICE IS ACTIVATED | 5 |
| 1/2 05:30:00 | A SERVICE IS ACTIVATED | 4 |
| 1/2 05:30:00 | B SERVICE IS ACTIVATED | 5 |
| | ... | |

FIG. 21

TARGET LOG: LEARNING LOG

| MESSAGE FORMAT ID | MESSAGE FORMAT | NUMBER OF APPEARANCE IN 1/1 00:00:00 TO 00:10:00 | | | | | | | |
|---|---|---|---|---|---|---|---|---|---|
| | | 1/1 00:00:00 | 1/1 00:10:00 | ... | 1/1 01:00:00 | 1/1 01:10:00 | ... | 1/1 05:00:00 | ... | 1/1 05:30:00 |
| 1 | ERROR IN DB | 1 | 0 | ... | 1 | 0 | ... | 0 | ... | 0 |
| 2 | BACKUP IS STARTED WITH IP:* | 1 | 0 | ... | 1 | 0 | ... | 0 | ... | 0 |
| 3 | BACKUP IS COMPLETED WITH IP:* | 0 | 1 | ... | 0 | 1 | ... | 0 | ... | 0 |
| 4 | A SERVICE IS ACTIVATED | 0 | 0 | ... | 0 | 0 | ... | 1 | ... | 1 |
| 5 | B SERVICE IS ACTIVATED | 0 | 0 | ... | 0 | 0 | ... | 1 | ... | 1 |
| ... | | | | | | | | | | |

OBSERVATION DATA MATRIX Y

FIG. 22

BACKUP MESSAGE GROUP:

| MESSAGE FORMAT ID | | |
|---|---|---|
| 1 | 1 | 0 |
| 2 | 1 | 0 |
| 3 | 0 | 1 |
| 4 | 0 | 0 |
| 5 | 0 | 0 |
| ... | | |

SERVICE ACTIVATION MESSAGE GROUP:

| MESSAGE FORMAT ID | | |
|---|---|---|
| 1 | 0 | 0 |
| 2 | 0 | 0 |
| 3 | 0 | 0 |
| 4 | 1 | 0 |
| 5 | 1 | 0 |
| ... | | |

FIG. 23

| TARGET LOG: ERROR PERIPHERY LOG | |
|---|---|
| TIME | MESSAGE |
| | ... |
| 1/31 23:00:01 | XXXXXX |
| 2/1 00:00:01 | ERROR IN DB |
| 2/1 00:00:05 | BACKUP IS STARTED WITH IP:192.168.0.1 |
| 2/1 00:10:00 | BACKUP IS COMPLETED WITH IP:192.168.0.1 |
| | ... |
| 2/1 00:30:00 | ERROR IN DB |
| 2/1 00:32:00 | A SERVICE IS ACTIVATED |
| 2/1 01:30:00 | YYYYYY |
| | ... |

FIG. 24

TARGET LOG: ERROR PERIPHERY LOG

| MESSAGE FORMAT ID | MESSAGE FORMAT | ... | 2/1 00:00:00 | 2/1 00:10:00 | ... | 2/1 00:30:00 | ... |
|---|---|---|---|---|---|---|---|
| 1 | ERROR IN DB | | 1 | 0 | | 1 | |
| 2 | BACKUP IS STARTED WITH IP:* | | 1 | 0 | | 0 | |
| 3 | BACKUP IS COMPLETED WITH IP:* | | 0 | 1 | | 0 | |
| 4 | A SERVICE IS ACTIVATED | | 0 | 0 | | 1 | |
| 5 | B SERVICE IS ACTIVATED | | 0 | 0 | | 0 | |
| ... | | | | | | | |

OBSERVATION DATA MATRIX Y'

FIG. 25

| TARGET LOG: ERROR PERIPHERY LOG | | | | | |
|---|---|---|---|---|---|
| MESSAGE GROUP | 2/1 00:00:00 | 2/1 00:10:00 | ... | 2/1 00:30:00 | ... |
| BACKUP MESSAGE GROUP | 1 | 0 | ... | 0 | ... |
| SERVICE ACTIVATION MESSAGE GROUP | 0 | 0 | ... | 0 | ... |

WEIGHTING COEFFICIENT MATRIX U'

| TARGET LOG: ERROR PERIPHERY LOG | | | | | |
|---|---|---|---|---|---|
| MESSAGE FORMAT ID | MESSAGE FORMAT | 2/1 00:00:00 | 2/1 00:10:00 | ... | 2/1 00:30:00 |
| 1 | ERROR IN DB | 0 | 0 | ... | 1 |
| 2 | BACKUP IS STARTED WITH IP:* | 0 | 0 | ... | 0 |
| 3 | BACKUP IS COMPLETED WITH IP:* | 0 | 0 | ... | 0 |
| 4 | A SERVICE IS ACTIVATED | 0 | 0 | ... | 1 |
| 5 | B SERVICE IS ACTIVATED | 0 | 0 | ... | 0 |
| ... | | | | | |

ANOMALY MESSAGE MATRIX A

ANOMALY MESSAGE GROUP:
2/1 00:30:00 "ERROR IN DB"
2/1 00:30:00 "A SERVICE IS ACTIVATED"

FIG. 28

TARGET ERROR MESSAGE 2: 2/1 00:30:00 ERROR IN DB

WEIGHTING COEFFICIENT MATRIX U'

| MESSAGE GROUP | 2/1 00:00:00 | 2/1 00:10:00 | ... | 2/1 00:30:00 | ... |
|---|---|---|---|---|---|
| BACKUP MESSAGE GROUP | 1 | 0 | | 0 | |
| SERVICE ACTIVATION MESSAGE GROUP | 0 | 0 | ... | 0 | ... |

NO APPEARANCE OF FREQUENT MESSAGE GROUP

FIG. 29

- OUTPUT RESULT
- TARGET ERROR MESSAGE 1: 2/1 00:00:01 ERROR IN DB

RELATED MESSAGE GROUP

| 2/1 00:00:05 | BACKUP IS STARTED WITH IP:192.168.0.1 |
| 2/1 00:10:00 | BACKUP IS COMPLETED WITH IP:192.168.0.1 |

- TARGET ERROR MESSAGE 2: 2/1 00:30:00 ERROR IN DB

RELATED MESSAGE GROUP

| 2/1 00:32:00 | A SERVICE IS ACTIVATED |

OUTPUT METHOD AND INFORMATION PROCESSING APPARATUS

CROSS-REFERENCE TO RELATED APPLICATION

This application is based upon and claims the benefit of priority of the prior Japanese Patent Application No. 2019-45267, filed on Mar. 12, 2019, the entire contents of which are incorporated herein by reference.

FIELD

The embodiments discussed herein are related to an output method and an information processing apparatus.

BACKGROUND

In coping with an incident in an information and communications technology (ICT) system, when the incident occurs, a known failure determination is performed to determine whether or not the incident occurred in the past. When the incident occurred, the countermeasure or the like in the past is reused.

The known failure determination is performed by searching a failure case DB holding an incident coping record in the past. In this case, an error message triggering the incident is often searched as a keyword. However, in searching of the failure case DB only by the triggering error message, an event with different cause and countermeasure may be erroneously identified although the contents of the error messages are the same. For this reason, in recent years, a technique for suppressing an erroneous search has been used in which a target error message and a frequent message group frequently appeared therewith in the past are identified and the frequent message group is used for searching the incident.

Japanese Laid-open Patent Publication No, 2006-4346; and Japanese Laid-open Patent Publication No. 2017-72882 are examples of related art.

Watanabe Yukihiro, Otsuka Hiroshi, Sonoda Masataka, Kikuchi Shinji, Matsumoto Yasuhide, "Online failure prediction in cloud datacenters by real-time message pattern learning", 4th IEEE International Conference on Cloud Computing Technology and Science Proceedings, Taipei, pp. 504-511, 2012, Tora Shotaro, Toyoda Machiko, Nakamura Yoshitaka, "Consideration of Change in Gap between Time Frames in Convolutive NMF", NTT Software Innovation Center, DEIM Forum 2015 F8-1, and Wang Wenwu, Cichocki Andrzej, Chambers A. Jonathon, "A multiplicative algorithm for convolutive non-negative matrix factorization based on squared Euclidean distance", IEEE Transactions on Signal Processing, vol. 57, No. 7, pp. 2858-2864, 2009 are also examples of related art.

SUMMARY

According to an aspect of the embodiments, a non-transitory computer-readable recording medium has stored therein a program that causes a computer to execute a process including: creating a frequent message group based on an appearance frequency of each message included in a message group that is generated in the past, in response to a generation of an error message; extracting, as an error periphery log, a message group within a predetermined time period before and after the error message from an accumulated message group; determining whether or not the error message is included in the frequent message group based on a degree of relation between the error periphery log and the frequent message group; and outputting a message that is not included in the frequent message group in the error periphery log as a related message associated with the error message based on a result of the determining.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram describing a list of definitions in the learning method;

FIG. 8 is a diagram describing a classification result of a learning log;

FIG. 9 is a diagram explaining a creation of an observation data matrix;

FIG. 10 is a diagram describing a learning result of a frequent message group;

FIG. 11 is a diagram explaining an extraction of an error periphery log;

FIG. 12 is a diagram explaining the observation data matrix for the error periphery log;

FIG. 13 is a diagram describing an example of a calculation result of a weighting coefficient matrix;

FIG. 20 is a diagram describing a classification result of a learning log according to a second embodiment;

FIG. 21 is a diagram explaining a creation of an observation data matrix according to the second embodiment;

FIG. 22 is a diagram explaining a learning result of a frequent message group according to the second embodiment;

FIG. 23 is a diagram explaining an extraction of an error periphery log according to the second embodiment;

FIG. 24 is a diagram explaining an observation data matrix for the error periphery log according to the second embodiment;

FIG. 25 is a diagram describing an example of a calculation result of a weighting coefficient matrix according to the second embodiment;

FIG. 28 is a diagram explaining a determination example 2 of the message according to the second embodiment;

FIG. 29 is a diagram explaining an output result according to the second embodiment.

DESCRIPTION OF EMBODIMENTS

As in the Background described above, a new error message and an error message with a low appearance frequency which are not included in a frequent message group may not be used for an incident search, so that it is hard to identify an effective countermeasure.

Hereinafter, embodiments of an output program, an output method, and an information processing apparatus disclosed herein will be described in detail based on drawings. It is noted that the embodiments do not limit the present disclosure. Further, the embodiments may be combined with each other as appropriate within a scope where there is no contradiction.

First Embodiment

Overall Configuration

Figure 1:
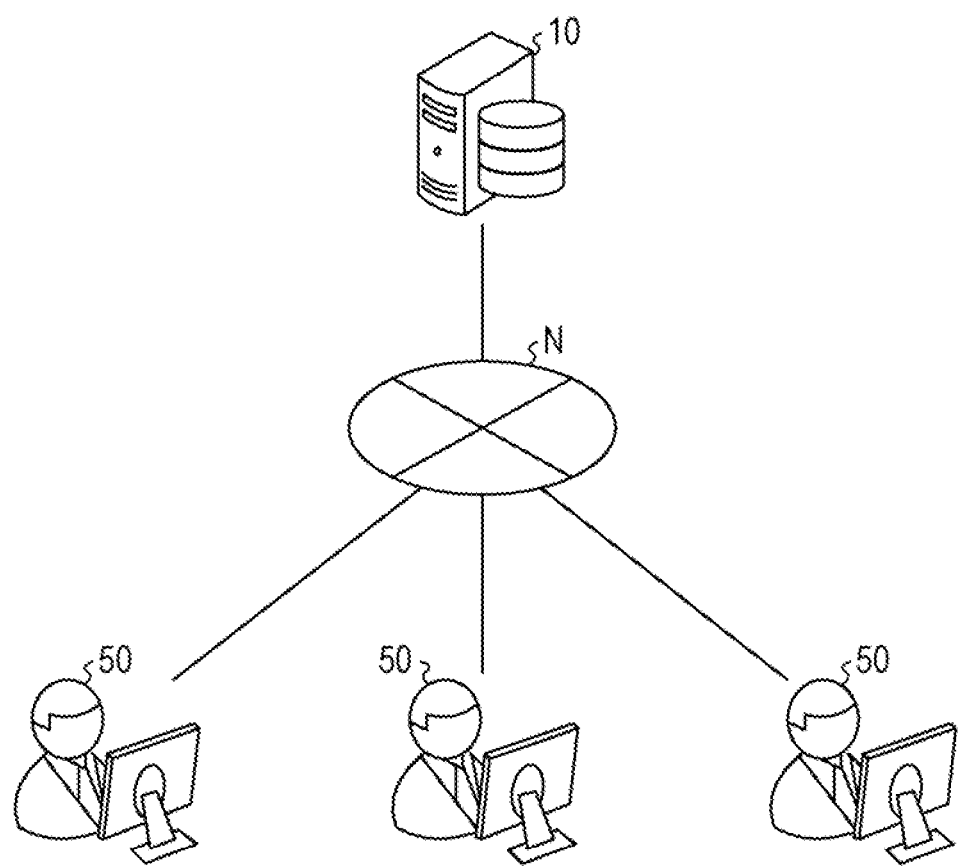
FIG. 1 is a diagram explaining an overall configuration of an incident search system according to a first embodiment.

FIG. 1 is a diagram explaining an example of an overall configuration of an incident search system according to a first embodiment. As illustrated in FIG. 1, in the system, an information processing apparatus 10 and a plurality of user terminals 50 are coupled to communicate with each other via a network N. Various communication networks such as the Internet or dedicated lines may be adopted for the network N regardless of wired or wireless communication.

The information processing apparatus 10 is an example of a computer apparatus which includes a failure case DB holding incident coping records of the past and returns past countermeasure contents in response to a search request from each of the user terminals.

Each of the user terminals 50 is an example of a computer apparatus used by a system administrator or the like, and transmits a search request having an error message as a search condition to the information processing apparatus 10 when a system failure or the like occurs. Then, each of the user terminals 50 acquires the countermeasure contents corresponding to the search request. In this way, when a failure occurs, the system administrator acquires the countermeasure contents performed in the past and copes with the failure.

Figure 2:
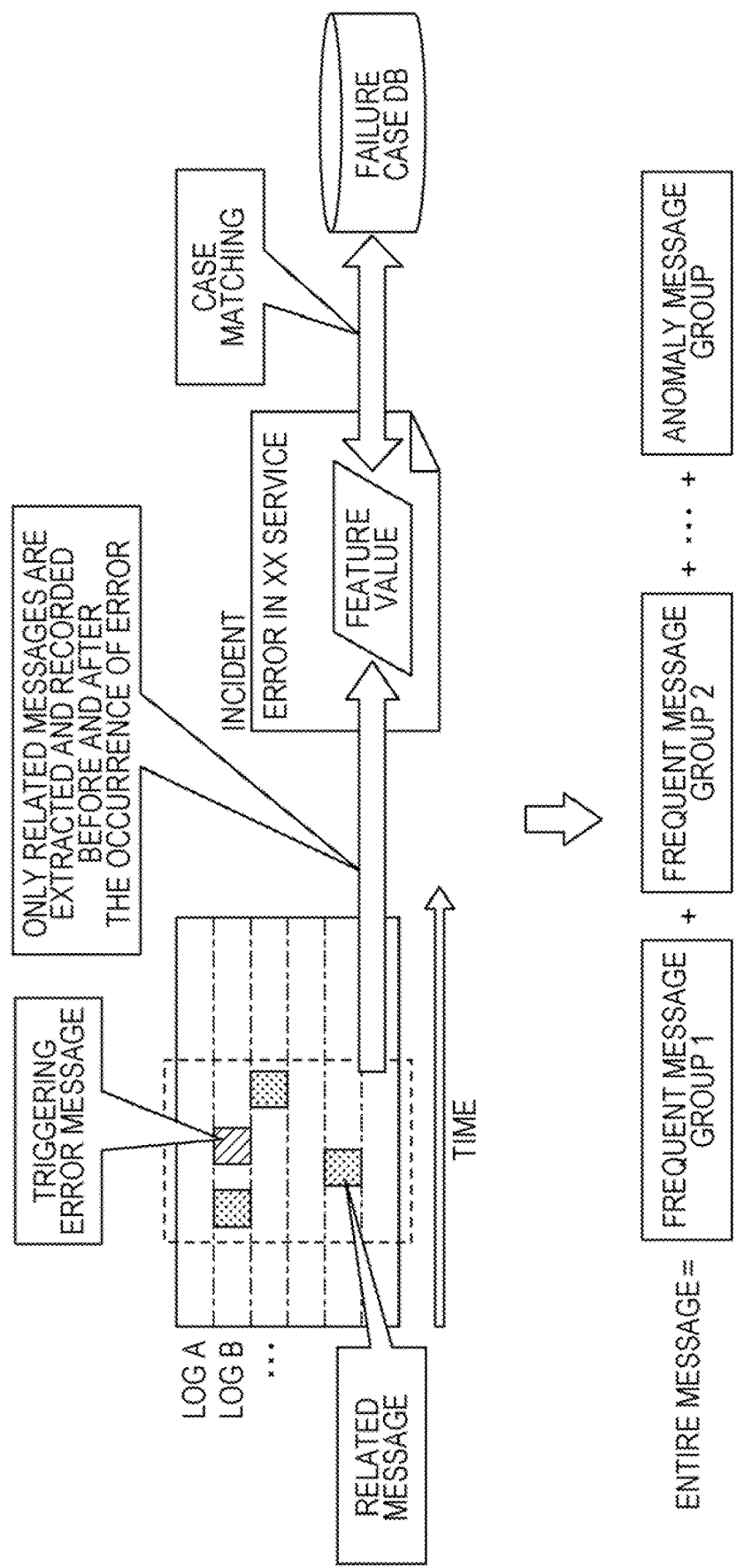
FIG. 2 is a diagram explaining an incident search by an information processing apparatus according to the first embodiment.

An incident search performed by the information processing apparatus 10 in response to the search request from each of the user terminals 50 will now be described. FIG. 2 is a diagram explaining the incident search performed by the information processing apparatus 10 according to the first embodiment. As illustrated in FIG. 2, the information processing apparatus 10 collects log messages (hereinafter may be simply referred to as a "log") of a target system in a time series in the order of an output.

When a system failure "error in XX service" occurs, the information processing apparatus 10 identifies a triggering error message which triggered the system failure. The information processing apparatus 10 automatically selects and collects related messages around the triggering error message from before and after the generation of the triggering error message. The information processing apparatus 10 then performs the characterization of the incident by associating with the system failure "error in XX service" with the related messages as a feature value, and uses it for a case matching of the failure case.

Here, the information processing apparatus 10 factorizes the entire log messages into a frequent message group which frequently appears together and an anomaly message group which has a low appearance frequency. A periodic restart or a periodic backup of a server is an example of the frequent message. The information processing apparatus 10 extracts a message group including an error as a related message group. For example, errors frequently occurred in the past are included in the frequent message group, and errors which are new or not frequent are included in the anomaly message group.

The information processing apparatus 10 may generate a related message group relating to the error and manage the related message group as the feature value of the error even when the error has a low occurrence frequency. As the result, the information processing apparatus 10 may perform an incident search using efficiently an error message with a low appearance frequency since the log corresponding to the anomaly message group may be used for the incident search.

Functional Configuration

Figure 3:
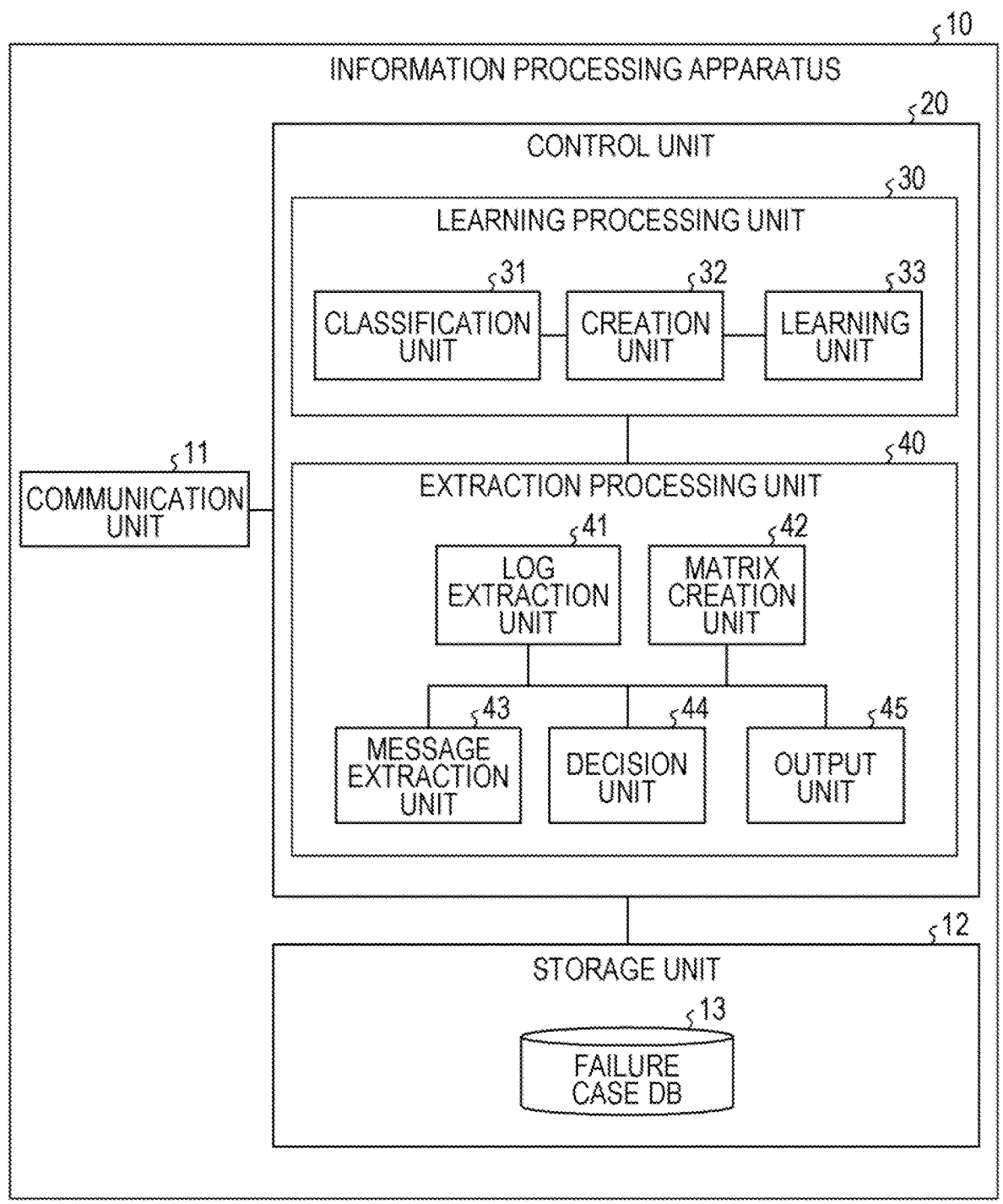
FIG. 3 is a functional block diagram illustrating a functional configuration of the information processing apparatus according to the first embodiment.

FIG. 3 is a functional block diagram illustrating a functional configuration of the information processing apparatus 10 according to the first embodiment. As illustrated in FIG. 3, the information processing apparatus 10 includes a communication unit 11, a storage unit 12, and a control unit 20.

The communication unit 11 is a processing unit that controls communication with other devices and is a communication interface or the like, for example. The communication unit 11, for example, receives a list of log messages of the target system, receives various requests and data from the user terminals 50, and transmits various information and the like to the user terminals 50.

The storage unit 12 is an example of a storage device storing data and various programs that are executed by the control unit 20 or the like, and is, for example, a memory, a hard disk, or the like. The storage unit 12 stores a failure case DB 13.

Figures 4, 5:
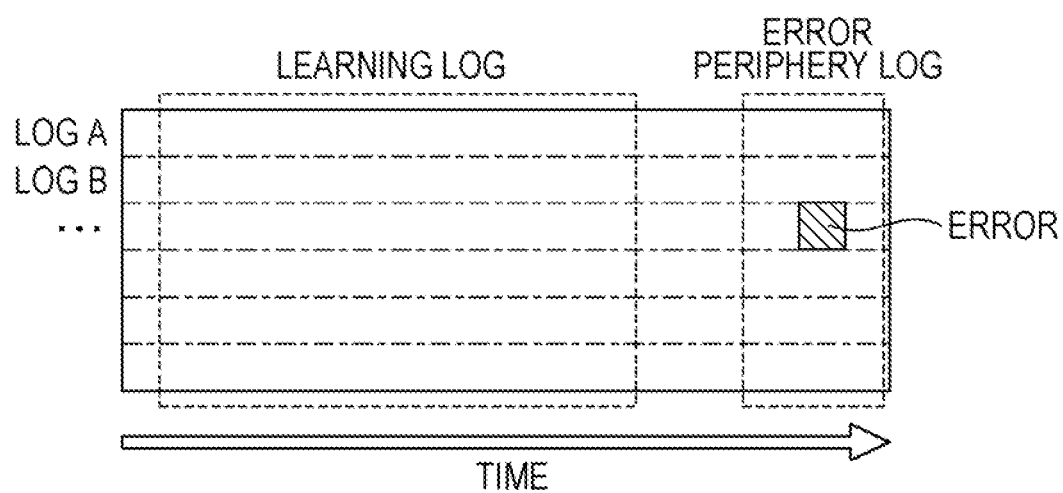
FIG. 4 is a diagram describing an example of information stored in a failure case DB.
FIG. 5 is a diagram explaining a log message to be used.

The failure case DB 13 is a database storing incident coping records of the past. The failure case DB 13 stores the countermeasure contents when a failure occurs. FIG. 4 is a diagram describing an example of information stored in the failure case DB 13. As illustrated in FIG. 4, the failure case DB 13 stores "message group" and "countermeasure" in association with each other.

Here, the stored "message group" means the message that is output when a failure occurs, and the "countermeasure" means the countermeasure contents performed to correct the failure. In the example in FIG. 4, it is described that a countermeasure "YY service is activated after restart" was performed for a failure in which both "error in XX" and "YY service is stopped" messages were output. The information stored in the failure case DB 13 may further be associated with the failure contents or the like, and may be changed arbitrarily. The information stored therein may be stored by the administrator or the like, and the information processing apparatus 10 may automatically generate the information by using a known technique.

The control unit 20 is a processing unit that manages the entire information processing apparatus 10 and is, for example, a processor or the like. The control unit 20 includes a learning processing unit 30 and an extraction processing unit 40. The learning processing unit 30 and the extraction processing unit 40 are an example of an electronic circuit included in the processor or processes that are executed by the processor.

A log message used in the learning processing unit 30 and the extraction processing unit 40 will be described. FIG. 5 is a diagram explaining a log message to be used. As illustrated in FIG. 5, in a log message stored in time series in the order of output, the learning processing unit 30 uses a log for a predetermined period before an error occurrence as a learning log. The extraction processing unit 40 uses a log around the time of an error message including the error message as an error periphery log, unlike the learning log.

Figure 6:
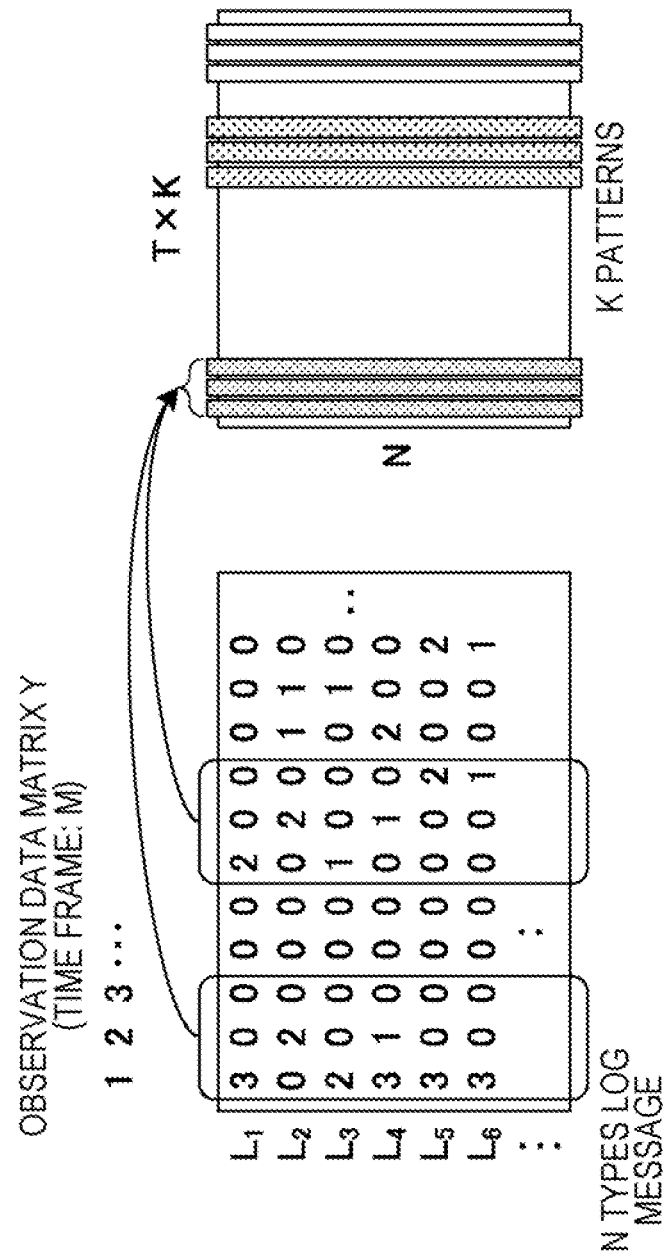
FIG. 6 is a diagram explaining an example of a learning method.

In this embodiment, for example, as described in the "NTT Software Innovation Center, Consideration of Change in Gap between Time Frames in Convolutive NMF, DEIM 2015", convolutive non-negative matrix factorization (CNMF), in which non-negative matrix factorization (NMF) is extended, may be used. FIG. 6 is a diagram explaining an example of a learning method. As illustrated in FIG. 6, in this embodiment, the problem is formulated as a matrix factorization, and a frequent message group is extracted as a base. For example, the number of appearances of each log ($L_1$ to $L_N$) is counted in a time frame of an observation data matrix. When a base matrix is extracted from the observation data matrix, the base matrix is processed so as to have a width T, and the frequent message group is extracted as the base.

A list of definitions used in the CNMF is described in FIG. 7. FIG. 7 is a diagram describing a list of definitions in a learning method. As illustrated in FIG. 7, as symbols used in the present embodiment, defined are an observation data matrix of a learning log, a weighting coefficient matrix of learning log, an observation data matrix of error periphery log, a weighting coefficient matrix of error periphery log, a base matrix (frequent message group), an anomaly massage matrix, a maximum number of frequent message group, a number of message format, a time frame width of observation data matrix, and a time width of base matrix. In this embodiment, the time frame width of observation data matrix is defined as $T_M$, the maximum number of frequent message group is defined as K, and the time width of base matrix is defined as T.

Referring back to FIG. 3, the learning processing unit 30 includes a classification unit 31, a creation unit 32, and a learning unit 33, and is a processing unit that performs a learning processing for a frequent message group. The learning processing unit 30 performs a learning phase.

The classification unit 31 is a processing unit that classifies a message having a similar format from a learning log. For example, the classification unit 31 acquires a log message corresponding to the learning log described in FIG. 5 from a list of log messages, classifies the log message by a message format in which parameter portions included in the message such as an internet protocol (IP) address, a host name, and the like are excluded, and outputs the log message to the creation unit 32.

FIG. 8 is a diagram describing a classification result of a learning log. As illustrated in FIG. 8, the classification unit 31 classifies messages assigning the message format ID "1" to "error in DB", assigning the message format ID "2" to "backup is started with IP: *", and assigning the message format ID "3" to "backup is completed with IP: *". Further, the classification unit 31 classifies messages assigning the message format ID "4" to "A service is activated" and assigning the message format ID "5" to "B service is activated".

The creation unit 32 is a processing unit that creates an observation data matrix for learning using a classification result by the classification unit 31. For example, the creation unit 32 aggregates the number of appearances of each classified message format, creates an observation data matrix Y based on the aggregation result, and outputs the observation data matrix Y to the learning unit 33.

FIG. 9 is a diagram explaining a creation of an observation data matrix. As illustrated in FIG. 9, the creation unit 32 counts the number of appearances of each message such as "error in DB", to which each message format ID from "1" to "5" is assigned, in each time zone such as "1/1 00:00:00 to 00:10:00". In the example of FIG. 9, the message "error in DB" of message format ID "1" indicates that the number of appearances is "0" in the time zone "1/1 00:00:00 to 00:10:00", the number of appearances is "0" in the time zone "1/1 00:10:00 to 00:20:00", and the number of appearances is "1" in the time zone "1/1 01:00:00 to 01:10:00". In this way, the creation unit 32 creates an observation data matrix Y with the aggregation result of each message.

The learning unit 33 is a processing unit that learns a frequent message group based on a creation result of an observation data matrix by the creation unit 32. For example, the learning unit 33 learns the frequent message group (base matrix H) using the CNMF described above by setting the time width T of the base matrix to 2 and the number of frequent message group K to 2.

FIG. 10 is a diagram describing a learning result of a frequent message group. As described in FIG. 10, the learning unit 33 performs the CNMF for the observation data matrix Y described in FIG. 9 so as to extract a backup message group and a service activation message group as a frequent message group and output the frequent message group to the extraction processing unit 40.

The backup message group is a message group including "backup is started with IP: *" in which the message format ID is "2" and "backup is completed with IP: *" in which the message format ID is "3" described in FIG. 8 and FIG. 9. The service activation message group is a message group including "A service is activated" in which the message format ID is "4" and "B service is activated" in which the message format ID is "5" described in FIG. 8 and FIG. 9.

The extraction processing unit 40 is a processing unit that includes a log extraction unit 41, a matrix creation unit 42, a message extraction unit 43, a determination unit 44, and an output unit 45, and that extracts a related message group relating to an error message.

The log extraction unit 41 is a processing unit that extracts a periphery log of an error log in order to perform a log extraction relating to the error log. For example, the log extraction unit 41 acquires a log message corresponding to the error periphery log described in FIG. 5 from a list of log messages, and outputs the log message to the matrix creation unit 42.

FIG. 11 is a diagram explaining an extraction of an error periphery log. As illustrated in FIG. 11, the log extraction unit 41 extracts logs within 60 minutes before and after the generation of an error message as an error periphery log from the entire log messages. In the example of FIG. 11, since an error message "error in DB" is generated in "2/1

"00:30:00", messages from "XXXXX" generated in "1/31 23:30:00" which is 60 minutes before the "2/1 00:30:00" to "YYYYY" generated in "2/1 01:30:00" which is 60 minutes after the "2/1 00:30:00" are extracted as an error periphery log.

The matrix creation unit 42 is a processing unit that counts the number of appearances of each message format classified in the learning phase by the learning processing unit 30, and that creates an observation data matrix for an error periphery log. For example, the matrix creation unit 42 classifies the error periphery log for each message format ID described in FIG. 9. Then, the matrix creation unit 42 aggregates the number of appearances of each classified message format, creates an observation data matrix Y using the CNMF, and outputs the generated observation data matrix Y to the message extraction unit 43.

FIG. 12 is a diagram explaining an observation data matrix for an error periphery log. As described in FIG. 12, the matrix creation unit 42 classifies an error periphery log extracted by the log extraction unit 41 into messages each having the message format ID from "1" to "5" classified by the learning processing unit 30. Then, the matrix creation unit 42 aggregates the number of appearances in each time zone for each classified message format with the same method as that of the learning processing unit 30. In this manner, the matrix creation unit 42 creates an observation data matrix Y' from an error periphery log.

The message extraction unit 43 is a processing unit that extracts a frequent message group included in an observation data matrix created by the matrix creation unit 42, using a base matrix learned in the learning phase by the learning processing unit 30. For example, the message extraction unit 43 may employ the technique described in "Wang Wenwu, Cichocki Andrzej, Chambers A. Jonathon, 'A multiplicative algorithm for convolutive non-negative matrix factorization based on squared Euclidean distance', IEEE Transactions on Signal Processing, vol. 57, No. 7, pp. 2858-2864, 2009". For example, the message extraction unit 43 extracts a frequent message group based on the equation (1) using the base matrix $H_t$ and the observation data matrix Y' learned by the learning processing unit 30.

$$U'^* = \underset{U'}{\operatorname{argmin}} \left\| Y' - \sum_{t=0}^{T-1} H_t \overset{t\rightarrow}{U'} \right\|_2^2, U' > 0 \quad (1)$$

($\|\ \|_2$ represent an L2 norm)

Since a weighting coefficient matrix U' represents a frequent message group included in an error periphery log, by obtaining the weighting matrix U' that minimizes the equation (1), it is possible to extract a frequent message group included in an observation data matrix Y' created from error periphery messages. FIG. 13 is a diagram describing an example of a calculation result of a weighting coefficient matrix. In this embodiment, as described in FIG. 13, it is assumed that "1" is set to the time zone "2/1 00:00:00 to 00:10:00" for the backup message group in the frequent message group.

Further, the message extraction unit 43 extracts an observation data matrix Y', which may not be represented with a frequent message group, as an anomaly message group. For example, the message extraction unit 43 calculates, using equation (2), a message group which may not be represented by a combination of base matrices $H_t$ in an observation data matrix Y' as an anomaly message matrix.

$$A = Y' - \sum_{t=0}^{T-1} H_t \overset{t\rightarrow}{U'} \quad (2)$$

Figure 14:
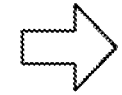
FIG. 14 is a diagram explaining an extraction of an anomaly message group.

Then, the message extraction unit 43 extracts message formats with an element value larger than 0 as an anomaly message group, among elements of a calculated anomaly message matrix. FIG. 14 is a diagram explaining an extraction of an anomaly message group. As described in FIG. 14, the message extraction unit 43 calculates an anomaly message matrix A using calculation results for messages with the message format ID from "1" to "5" classified by the learning processing unit 30. Then, the message extraction unit 43 extracts, as an anomaly message group, "2/1 00:30:00 error in DB" and "2/1 00:30:00 A service is activated" of which elements value are set to "1" which is larger than 0.

Referring back to FIG. 3, the determination unit 44 is a processing unit that performs a determination of a related message relating to an error message. For example, the determination unit 44 identifies and assigns a frequent message group including a target error message as a related message group. When the frequent message group is not identified, the determination unit 44 extracts an anomaly message group as the related message group.

Figure 15:
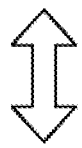
FIG. 15 is a diagram explaining a determination of a message.

FIG. 15 is a diagram explaining a determination of a message. As described in FIG. 15, the determination unit 44 compares the time zone of the target error message "error in DB" of "2/1 00:30:00" described in FIG. 11 with a weighting coefficient matrix U'. The determination unit 44 determines that a related message group may not be identified since a frequent message group do not appear in the time zone "00:30:00 to 00:40:00" including the time zone "2/1 00:30:00" when the error message is generated.

Figure 16:
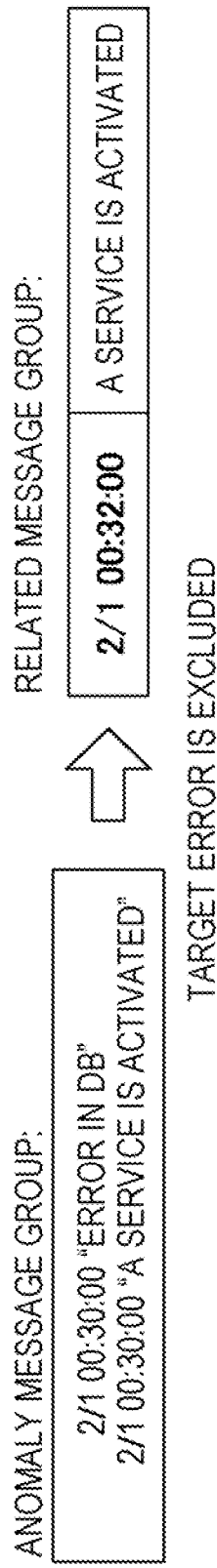
FIG. 16 is a diagram explaining a related message group.

Then, the determination unit 44 determines that an anomaly message group is a related message group since no frequent message group appears. FIG. 16 is a diagram explaining a related message group. As described in FIG. 16, the determination unit 44 determines that the anomaly message group extracted in FIG. 14 is the related message, but only the "2/1 00:30:00 A service is activated" excluding the target error "error in DB" is set as the related message group in this case.

The output unit 45 is a processing unit that outputs a determination result by the determination unit 44. For example, the output unit 45 associates the target error message "2/1 00:30:00 error in DB" with the related message "2/1 00:30:00 A service is activated" and the associated messages are displayed on a screen or transmitted to an administrator's terminal.

As the result, when an error message "error in DB" is generated and a countermeasure is completed, an administrator or the like may register the incident in the failure case DB 13 associating the error message "error in DB" with the related message "A service is activated" and the countermeasure contents. Further, when the error message "error in DB" is generated in the next time, an administrator may acquire a past countermeasure by searching the failure case DB 13 with the "error in DB" and the "A service is activated" as the search condition.

Learning Phase Flow

Figure 17:
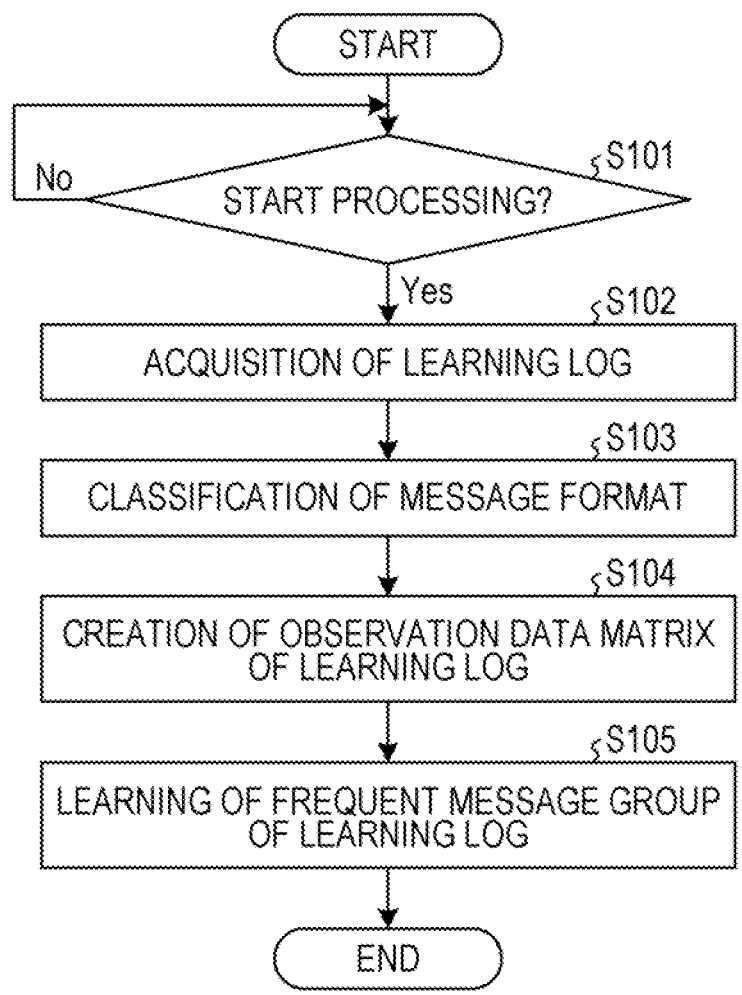
FIG. 17 is a flowchart describing a learning phase processing flow.

FIG. 17 is a flowchart describing a learning phase processing flow. As described in FIG. 17, the classification unit 31 of the learning processing unit 30 determines that a processing to be started periodically such as in every one week or when the number of log messages increases by a certain value or more (S101: Yes), acquires the log message, then acquires a learning log from the log message (S102).

Subsequently, the classification unit 31 classifies the learning log in message formats (S103). The creation unit 32 creates an observation data matrix of the learning log using the classification result (S104). Then, the learning unit 33 learns a frequent message group of the learning log using the observation data matrix (S105).

Extraction Phase Flow

Figure 18:
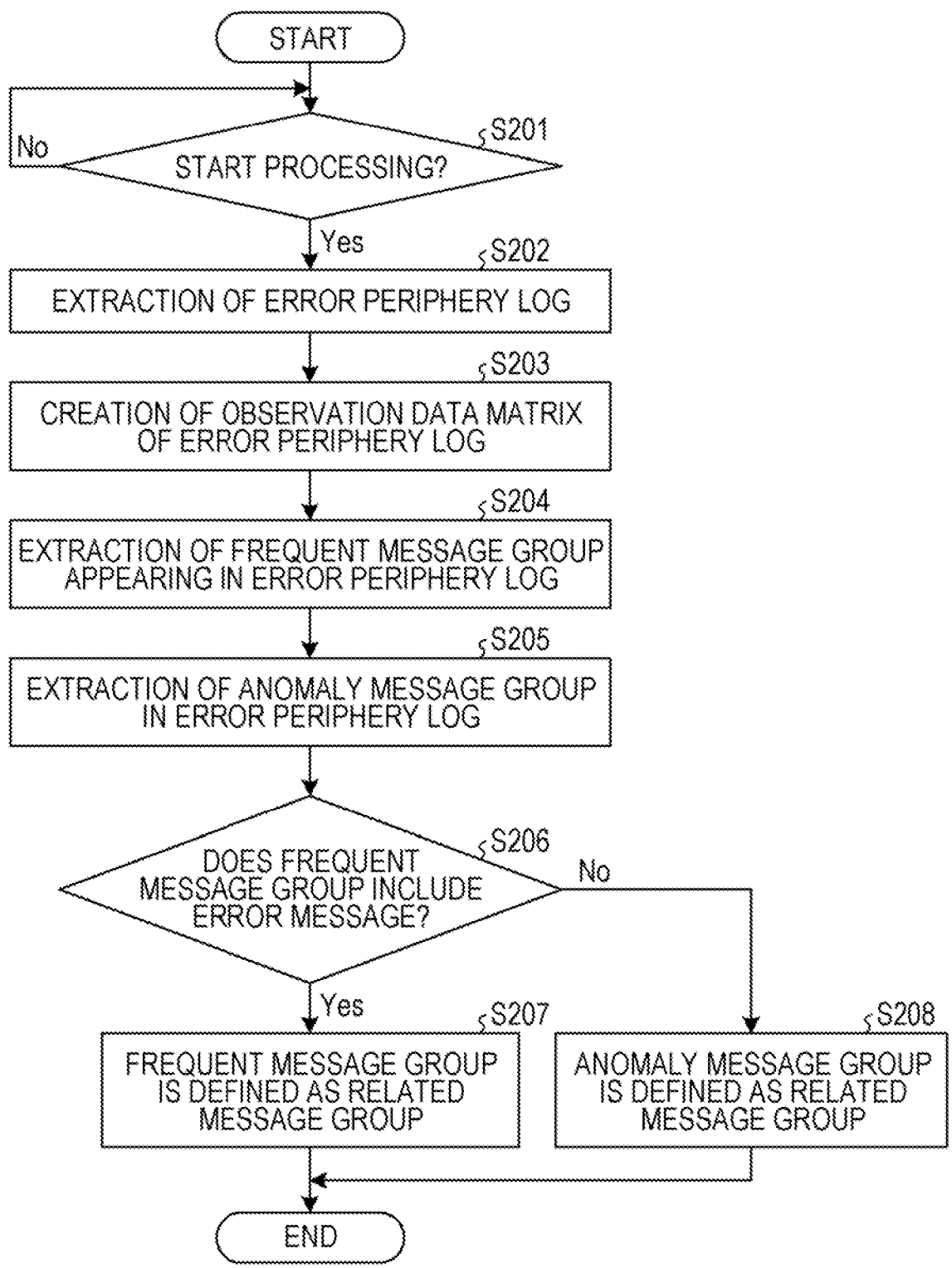
FIG. 18 is a flowchart describing an extraction phase processing flow.

FIG. 18 is a flowchart describing an extraction phase processing flow. As described in FIG. 18, the log extraction unit 41 in the log extraction processing unit 40 determines a processing to be started when an error message is detected (S201: Yes), and extracts an error periphery log from a log message (S202).

Subsequently, the matrix creation unit 42 creates an observation data matrix of the error periphery log (S203). The message extraction unit 43 extracts a frequent message group appearing in the error periphery log (S204), and extracts an anomaly message group in the error periphery log (S205).

Then, the determination unit 44 determines whether or not the frequent message group includes the error message (S206). When the frequent message group includes the error message (S206: Yes), the determination unit 44 determines the frequent message group as a related message group (S207), and when the frequent message group does not include the error message (S206: No), the determination unit 44 determines the anomaly message group as the related message group (S208).

Effects

As described above, the information processing apparatus 10 may classify the entire messages described in FIG. 5 into the frequent message group including no error message and the anomaly message group including the error message. The information processing apparatus 10 therefore may associate the new error message and the error message with a low appearance frequency, which are not included in the frequent message group, with the error message as the related message group. The information processing apparatus 10 may be used for an incident search in a known failure determination even in a case of a new error message or an error message having a low appearance frequency in the past, so that it is possible to suppress an erroneous search and improve search accuracy.

Second Embodiment

In a general technique associating a frequent message group alone as a related message, when multiple failures occur simultaneously (multipoint failure), there may be a case in which it is not possible to determine which message is related to which failure from the entire message.

Figure 19:
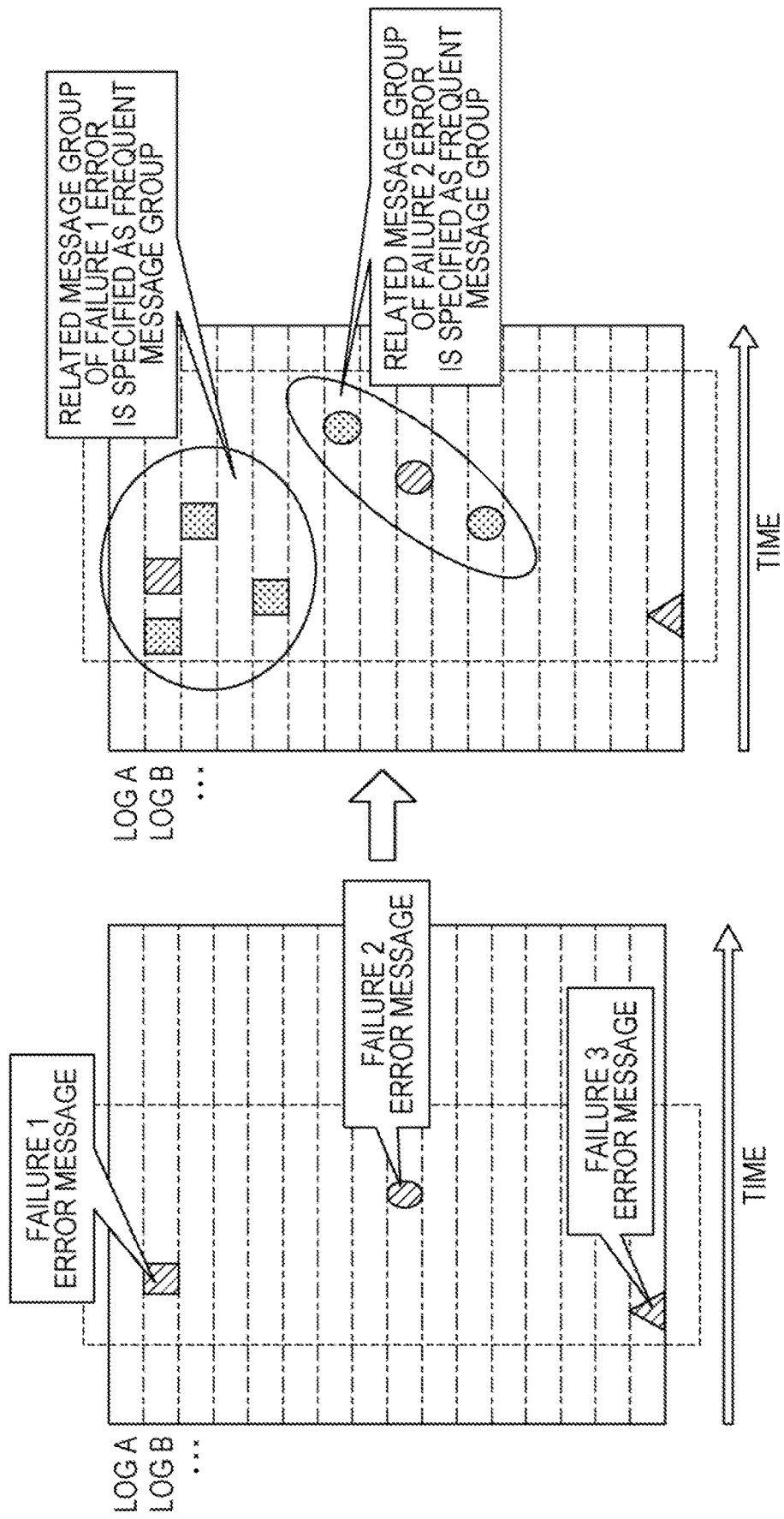
FIG. 19 is a diagram explaining a problem of a multipoint failure.

FIG. 19 is a diagram explaining a problem of a multipoint failure. FIG. 19 illustrates an example of a multipoint failure in which three failures, failures 1, 2, and 3 occur. When an anomaly message group as in the first embodiment is not used, each failure is associated with a frequent message group. For example, even when the related message of the failure 1 is identified as the frequent message group and the related message of the failure 2 is identified as the frequent message group, in a case that the failure 3 is a new error or an error with a low appearance frequency, a related message group may not be identified because the frequent message group does not exist.

As the result, error information of the failure 3 may not be registered as a failure case, and even when a failure similar to the failure 3 occurs next, the countermeasure may not be shared. This leads to a decrease in the reliability of the system.

Therefore, a case is described in the second embodiment, the case where a plurality of failures simultaneously occurs (multipoint failure) and an entire message is factorized into a related message group corresponding to each failure by extracting an anomaly message group described in the first embodiment as a related message group. Since the functional configuration, the learning method, and the like are the same as those in the first embodiment, detailed description thereof will be omitted.

Learning Phase

First, the learning processing unit 30 classifies messages whose formats are similar to each other from a learning log by using the same method as that in the first embodiment. FIG. 20 is a diagram describing a classification result of a learning log according to the second embodiment. As described in FIG. 20, the learning processing unit 30 classifies messages assigning the message format ID "1" to "error in DB", assigning the message format ID "2" to "backup is started with IP: *", and assigning the message format ID "3" to "backup is completed with the IP: *". Further, the classification unit 31 classifies messages assigning the message format ID "4" to "A service is activated" and assigning the message format ID "5" to "B service is activated".

The difference from the first embodiment is that two DB errors occur in FIG. 20 in the second embodiment, while one DB error occurs in FIG. 8 in the first embodiment. That is, in FIG. 20, a multipoint failure occurs.

Next, the learning processing unit 30 creates an observation data matrix for learning from a classification result by using the same method as that in the first embodiment. FIG. 21 is a diagram explaining a creation of an observation data matrix according to the second embodiment. As described in FIG. 21, the learning processing unit 30 counts the number of appearances of each message such as "error in DB", to which each message format ID from "1" to "5" is assigned, in each time zone such as "1/1 00:00:00 to 00:10:00". In the example of FIG. 21, unlike the first embodiment, the message "error in DB" with message format ID "1" is generated in both time zones "1/1 00:00:00 to 00:10:00" and "1/1 01:00:00 to 01:10:00". In this way, the learning processing unit 30 creates an observation data matrix Y with an aggregation result of each message.

Subsequently, the learning processing unit 30 learns a frequent message group from the creation result of an observation data matrix by the CNMF similar to that of the first embodiment. FIG. 22 is a diagram explaining a learning result of a frequent message group according to the second embodiment. As described in FIG. 22, the learning processing unit 30 performs the CNMF to the observation data matrix Y described in FIG. 21, thereby extracting a backup message group and a service activation message group as the frequent message group.

In contrast to the first embodiment, the backup message group is a message group including "error in DB" with message format ID "1" in addition to "backup is started with IP: *" with the message format ID "2" and "backup is completed with IP: *" with the message format ID "3". The service activation message group is the same as that in the first embodiment.

Extraction Phase

First, the extraction processing unit 40 extracts an error periphery log from a list of log messages in order to extract logs related to an error log. FIG. 23 is a diagram explaining an extraction of an error periphery log according to the second embodiment. Here, as two target error messages are generated, messages from up to 60 minutes before the first error to up to 60 minutes after the second error are extracted as the error periphery log.

In the example in FIG. 23, since the first error message 1 "error in DB" is generated in "2/1 00:00:01", the extraction processing unit 40 sets "XXXXX" generated in "1/31 23:00: 01" which is 60 minutes before the "2/1 00:00:01" as the start of the error periphery log. Furthermore, since the second error message 2 "error in DB" is generated in "2/1 00:30:00", the extraction processing unit 40 sets "YYYYY" generated in "2/1 01:30:00" which is 60 minutes after the "2/1 00:30:00" as the end of the error periphery log.

Subsequently, the extraction processing unit 40 counts the number of appearances of each message format classified in the learning phase, and creates an observation data matrix of the error periphery log. FIG. 24 is a diagram explaining an observation data matrix for an error periphery log according to the second embodiment. As described in FIG. 24, the extraction processing unit 40 classifies the extracted error periphery log into respective messages with the message format ID from "1" to "5" classified by the learning processing unit 30. The extraction processing unit 40 aggregates the number of appearances in each time zone for each classified message format with the same method as that of the learning processing unit 30. In contrast to the first embodiment, the message "error in DB" with message format ID "1" is counted in time zone "2/1 00:00:00 to 00:10:00". In this way, the extraction processing unit 40 creates an observation data matrix Y' from the error periphery log.

Next, the extraction processing unit 40 extracts a frequent message group included in the observation data matrix Y' using the base matrix $H_t$ learned in the learning phase, and by the same equation (1) as in the first embodiment. FIG. 25 is a diagram describing an example of a calculation result of a weighting coefficient matrix according to the second embodiment. Here, the extraction processing unit 40 calculates a weighting coefficient matrix U' representing the frequent message group included in the error periphery log. As described in FIG. 25, in the weighting coefficient matrix U', it is assumed that "1" is set to the time zone "2/1 00:00:00 to 00:10:00" in the backup message group, also in the second embodiment as in the first embodiment.

Figure 26:
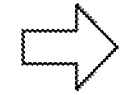
FIG. 26 is a diagram explaining an extraction of an anomaly message group according to the second embodiment.

Subsequently, the extraction processing unit 40 calculates a message group as an anomaly message matrix using the equation (2), the message group which may not be represented by the combination of the base matrices $H_t$ in the observation data matrix Y'. FIG. 26 is a diagram explaining an extraction of an anomaly message group according to the second embodiment. As described in FIG. 26, the extraction processing unit 40 calculates an anomaly message matrix A using a calculation result which is performed for each message with the message format ID from "1" to "5" classified in the learning phase. Then, the extraction processing unit 40 extracts "2/1 00:30:00 error in DB" and "2/1 00:30:00 A service is activated" as the anomaly message group in which "1" larger than 0 is set as the element value in the matrix.

Figure 27:
FIG. 27 is a diagram explaining a determination example 1 of a message according to the second embodiment.

Thereafter, the extraction processing unit 40 determines the related message relating to the error message. FIG. 27 is a diagram explaining a message determination example 1 according to the second embodiment, and FIG. 28 is a diagram explaining a message determination example 2 according to the second embodiment.

For example, as described in FIG. 27, the extraction processing unit 40 compares the time zone "2/1 00:00:01" of a target error message 1 "error in DB" described in FIG. 23 with the weighting coefficient matrix U', and determines that the related message group may be identified since the frequent message group "backup message group" appears in the time zone "2/1 00:00:00 to 00:10:00" including the generated time of the error message.

That is, the extraction processing unit 40 determines that the related message group of the error message 1 "error in DB" is the "backup message group". In more detail, the extraction processing unit 40 refers the error periphery log in FIG. 23 and determines messages "IP: 192.168.0.1 backup is started" of "2/1 0:0:00:05" and "IP: 192.168.0.1 backup is completed" of "2/1 00:10:00" appearing from "2/1 00:00:00" to "2/1 00:10:00" as the related message group of the target error message 1 "error in DB" of "2/1 00:00:01".

Further, as described in FIG. 28, the extraction processing unit 40 compares the time zone "2/1 00:30:00" of the target error message 2 "error in DB" described in FIG. 23 with the weighting coefficient matrix U', and determines that the related message group may not be identified since the frequent message group does not appear in the time zone "2/1 00:30:00 to 00:40:00" including the generated time of the error message.

That is, the extraction processing unit 40 determines that the related message group of the error message 2 "error in DB" is the "anomaly message group". In more detail, the extraction processing unit 40 sets only "A service is activated" of "2/1 00 30:00" excluding the target error "error in DB" as the related message group from "error in DB" of "2/1 00:30:00" and "A service is activated" of "2/1 00:30: 00" that are the anomaly message group extracted in FIG. 26.

Then, the extraction processing unit 40 outputs the determination result on the related message group for each error message. FIG. 29 is a diagram explaining an output result according to the second embodiment. As described in FIG. 29, the extraction processing unit 40 outputs "2/1 00:00:05, IP: 192.168.0.1 backup is started" and "2/1 00:10:00, IP: 192.168.0.1 backup is completed" as the related message group associating with the target error message 1 "error in DB" of "2/1 00:00:01". Similarly, the extraction processing unit 40 outputs "2/1 00:32:00, A service is activated" as the related message group associating with the target error message 2 "error in DB" of "2/1 00:30:00".

Effects

As described above, the information processing apparatus 10 may classify entire messages including the two error messages described in FIG. 23 into the frequent message group including the error message 1 and the anomaly message group including the error message 2. Therefore, when a multipoint failure including error messages of errors with a low occurrence frequency occurs, the information processing apparatus 10 may identify the related message group relating to each error message and associate the related message group with each error message.

Third Embodiment

While an embodiment of the present disclosure has been described, the present disclosure may be implemented in various different forms other than the embodiment described above.

Numerical Value or the Like

The numerical values, message contents, time widths, and the like used in the above embodiment are merely examples, and are not limited to those exemplified and illustrated, and may be arbitrarily changed. Although the multipoint failure in which two error messages are generated has been described as an example, the present disclosure is not limited thereto, and it is possible to perform the same processing in a multipoint failure of three or more errors.

The information processing apparatus 10 may be applied to the incident management of various systems such as a charging system, an order placing and receiving system, and a bank system. In the above embodiment, an example has been described in which the extraction phase is performed at the timing when the error message is generated, but the present disclosure is not limited to this example. For example, it is possible to perform the extraction phase such as at the timing when the error message is generated several times, and when the information processing apparatus 10 receives a search request including an error message from the user terminal 50.

The extraction of the frequent message group and the anomaly message matrix is not limited to the method of the equation (1) or (2), and a known method may be adopted.

System

Processing procedures, control procedures, specific names, and information containing various kinds of data and parameters indicated in the disclosure and the drawings may be changed arbitrarily unless otherwise specified.

The constituent elements in the devices illustrated in the drawings are conceptually functional ones and are not necessarily configured physically as illustrated in the drawings. Specific forms of distribution and integration of the devices are not limited to those illustrated in the drawings. All or some of the devices may be functionally or physically distributed or integrated in any unit based on various loads, usage statuses, or the like. For example, the learning processing unit 30 and the extraction processing unit 40 may be implemented in different devices.

All or some of the processing functions performed in the devices may be implemented by a central processing unit (CPU) and a program that run on the CPU for analyzing or a hardware device with wired logic.

Hardware

Figure 30:
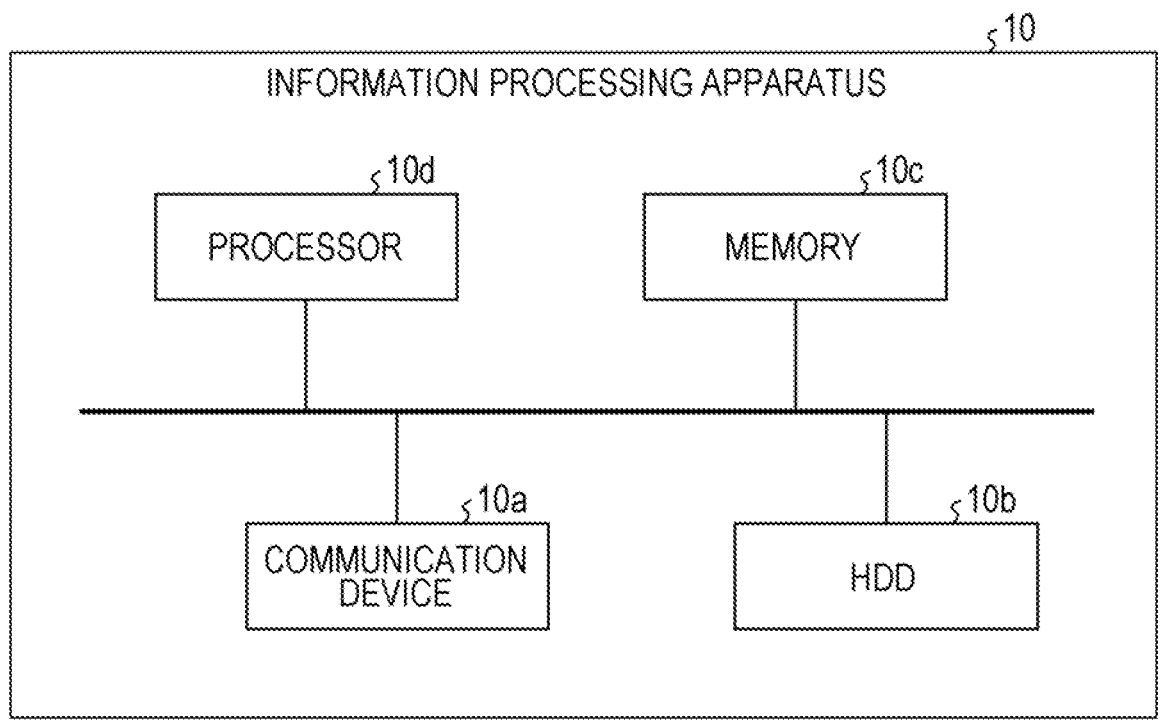
FIG. 30 is a diagram explaining an example of a hardware configuration.

FIG. 30 is a diagram explaining a hardware configuration example. As illustrated in FIG. 30, the information processing apparatus 10 includes a communication device 10a, a hard disk drive (HDD) 10b, a memory 10c, and a processor 10d. The devices illustrated in FIG. 30 are coupled to each other via a bus or the like.

The communication device 10a is, for example, a network interface card and communicates with another server. The HDD 10b stores a program for causing the functional units to operate and stores the DB illustrated in FIG. 3.

The processor 10d reads, from the HDD 10b or the like, a program for causing the substantially the same processes as those of the processing units illustrated in FIG. 3 to be performed and loads the program to the memory 10c to run a process of performing the functions described with reference to FIG. 3 and so on. In other words, the processes perform the same functions as that of the processing units included in the information processing apparatus 10. For example, the processor 10d reads the program that implements the same functions as those of such as the learning processing unit 30, the extraction processing unit 40, from the HDD 10b or the like. The processor 10d executes the processes that perform the same processing as that of the learning processing unit 30, the extraction processing unit 40, and the like.

As described above, the information processing apparatus 10 operates as an information processing apparatus that performs an incident management method by reading and executing the program. The information processing apparatus 10 may also perform the same functions as those of the embodiments described above by reading the program from a recording medium with the use of a medium reading device and by executing the read program. The program described in other embodiments is not limited to a program that is executed by the information processing apparatus 10. For example, the disclosure is applicable to the case in which another computer or a server executes the program, or the case in which the other computer and the server cooperate to execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   creating frequent message groups based on an appearance frequency of each message included in accumulated message group generated in the past;
   in response to a generation of an error message, extracting, as an error periphery log, a message group within a predetermined time period before and after the error message from the accumulated message group;
   determining whether or not the error message is included in one of the frequent message groups based on a degree of relation between the error periphery log and the frequent message groups; and
   outputting a message that is included in the error periphery log but not included in any of the frequent message groups, as a related message associated with the error message, based on a result of the determining.

2. The non-transitory computer-readable recording medium of claim 1, wherein the process further comprises:
   extracting a message group which is included in the error periphery log but not included in any of the frequent message groups as an anomaly message group;
   outputting one of the frequent message group groups as the related message when the error message is included in the one of the frequent message groups; and
   outputting the anomaly message group as the related message when the error message is not included in any of the frequent message groups.

3. The non-transitory computer-readable recording medium of claim 2, wherein creating the frequent message group includes:
   classifying, into a plurality of different message formats, messages included in an observation message group which is a message group generated in the past,
   creating an observation data matrix aggregating the number of appearances of each classified message format, and
   creating the frequent message group from the observation data matrix.

4. The non-transitory computer-readable recording medium of claim 3, wherein the extracting the error periphery log includes:
- classifying the error periphery log in each of the plurality of different message formats,
- creating an observation data matrix of an error periphery log aggregating the number of appearances of each classified message format, and
- wherein the determining whether or not the error message is included in the frequent message group includes:
- extracting the frequent message group included in the observation data matrix of the error periphery log,
- extracting the anomaly message group excluding the frequent message group from the observation data matrix of the error periphery log, and
- determining whether or not the frequent message group is generated in a time zone in which the error message is generated.

5. The non-transitory computer-readable recording medium of claim 4, wherein the outputting further includes:
- outputting the frequent message group as the related message when the frequent message group is generated in the time zone in which the error message is generated, and
- outputting the anomaly message group as the related message when the frequent message group is not generated in the time zone in which the error message is generated.

6. A computer-implemented output method comprising:
- creating frequent message groups based on an appearance frequency of each message included in accumulated message group generated in the past,
- in response to a generation of an error message, extracting, as an error periphery log, a message group within a predetermined time period before and after the error message from the accumulated message group;
- determining whether or not the error message is included in one of the frequent message groups based on a degree of relation between the error periphery log and the frequent message groups; and
- outputting a message that is included in the error periphery log but not included in any of the frequent message groups, as a related message associated with the error message, based on a result of the determining.

7. An information processing apparatus comprising:
a memory; and
a processor, coupled to the memory, configured to:
create frequent message group groups based on an appearance frequency of each message included in accumulated message group generated in the past;
in response to a generation of an error message, extract, as an error periphery log, a message group within a predetermined time period before and after the error message from the accumulated message group;
determine whether or not the error message is included in one of the frequent message groups based on a degree of relation between the error periphery log and the frequent message group groups; and
output a message that is included in the error periphery log but not included in any of the frequent message group groups, as a related message associated with the error message, based on a result of the determining.

* * * * *